United States Patent [19]
Pfalzer et al.

[11] Patent Number: 4,735,687
[45] Date of Patent: Apr. 5, 1988

[54] APPARATUS FOR DAMPING VIBRATIONS IN STOCK SUSPENSION FLOW

[75] Inventors: Lothar Pfalzer; Reimund Rienecker; Dieter Egelhof, all of Heidenheim, Fed. Rep. of Germany

[73] Assignee: J. M. Voith GmbH, Fed. Rep. of Germany

[21] Appl. No.: 876,227

[22] Filed: Jun. 19, 1986

[30] Foreign Application Priority Data

Jun. 29, 1985 [DE] Fed. Rep. of Germany ....... 3523385
Nov. 21, 1985 [DE] Fed. Rep. of Germany ....... 3541201

[51] Int. Cl.⁴ .......... D21D 5/02; D21F 1/06; F16L 55/04
[52] U.S. Cl. .................... 162/254; 138/26; 138/31; 162/380; 181/206
[58] Field of Search .............. 162/380, 252, 254, 259, 162/55, 263; 181/206; 381/71, 94; 138/26, 30, 31; 417/540; 209/269, 273

[56] References Cited

U.S. PATENT DOCUMENTS

| | | | |
|---|---|---|---|
| 2,575,333 | 11/1951 | Toro | 381/94 |
| 3,538,747 | 11/1970 | Munch | 73/53 |
| 4,171,465 | 10/1979 | Swinbanks | 181/206 |
| 4,199,295 | 4/1980 | Raffy et al. | 181/206 |
| 4,248,268 | 2/1981 | Choute | 138/81 |
| 4,308,095 | 12/1981 | Brendemuehl | 138/30 |
| 4,566,118 | 1/1986 | Chaplin et al. | 381/71 |
| 4,600,863 | 7/1986 | Chaplin et al. | 381/71 |
| 4,642,035 | 2/1987 | Nyquist | 138/26 |

FOREIGN PATENT DOCUMENTS 3427390 2/1986 Fed. Rep. of Germany ...... 162/380
2107960 10/1982 United Kingdom .

OTHER PUBLICATIONS

Dynamic Vibration Absorbers—J. B. Hunt—pp. 98–101.
Zeitschriftenschau—A. R. Mahmoud et al.

Primary Examiner—Steve Alvo
Attorney, Agent, or Firm—Ostrolenk, Faber, Gerb & Soffen

[57] ABSTRACT

Fibrous stock suspension preparation systems include moving parts that generate a vibration impulse flow in the outlet from the preparation system. A counter-vibration impulse generator is connected to the outlet pipe and includes a correcting impulse recorder also connected to the outlet pipe for sensing the vibrations of the flow therepast and for sending a signal to the counter-vibration generator to control the amplitude and/or the frequency of the counter-vibration generator. A further impulse recorder between the stock suspension preparation system and the first mentioned impulse recorder is also connected to the outlet pipe for providing a stock transit time correction signal for correcting the signal of the first mentioned impulse recorder.

6 Claims, 2 Drawing Sheets

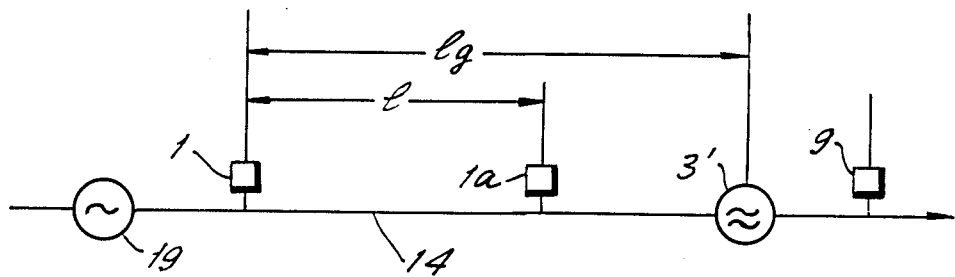
_FIG. 2_

APPARATUS FOR DAMPING VIBRATIONS IN STOCK SUSPENSION FLOW

BACKGROUND OF THE INVENTION

The invention relates to control apparatus for damping vibration impulses in preparation systems for stock suspensions, in particular fibrous suspensions. One such vibration damping control apparatus is known from "Das Papier", No. 10A, 1975, Pages V 144 to V 151.

Vibration impulses in pipe lines cause difficulties, particularly in the field of paper manufacture. The impulses originate far in front of the paper machine during the preparation of the pulp and the impulses travel right up to the head box of the paper machine, which results in irregular distribution of weight per unit area. Those machine parts which produce vibration impulses include pumps in particular, but also include so-called wire screens, in which a screening element, preferably in the form of a rotor having airfoils or blades, rotates generally in front of a rotationally symmetric wire basket. The individual screening elements particularly are the cause of such impulses. Therefore, the above-mentioned damping control apparatus for vibration damping was installed between such a screen disposed in front of the paper machine and the head box. One example of such apparatus is described in German Pat. No. 27 51 949.

SUMMARY OF THE INVENTION

The object of the invention is to improve the damping of vibrations in the fluid in the pipeline in front of the head box to a greater extent than is possible with known damping apparatus.

The object is solved with the control apparatus of the present invention which damps vibrations in the preparation system for preparing stock suspension for the head box of a paper machine. The preparation system includes means which produce the stock suspension and in the process of producing the suspension, those means generate vibration impulses in the stock. There is an inlet to the preparation system and an outlet conduit from it for the prepared stock suspension. The outlet conduit leading to the paper machine carries the stock suspension in which the vibration impulses have been generated during the preparation.

Broadly, the control apparatus includes means that are connected into the outlet conduit from the stock preparation system which produce counter-vibrations in the stock flow in the outlet conduit and those counter-vibrations are generated out of phase with the vibration impulses generated in the stock flow, which damps the vibrations in the flow of stock suspension in the outlet conduit. The means for producing the counter-vibrations includes means for sensing the vibration impulses in the stock flow. The counter-vibrations have frequency and amplitude and the means for producing them includes means for adjusting at least one and usually both of the frequency and amplitude of the counter-vibrations produced by the control apparatus so as to maintain the out-of-phase relationship and to maintain a sufficiently elevated level of counter-vibrations to damp the vibration impulses. The means producing the counter-vibrations comprise an induction recorder or induction oscillator and in a particular embodiment include a magnetizable metal core in an electric coil, the coil being connected with the means which senses the vibration impulses in the stock flow.

The means for sensing the vibration impulses in the stock flow comprises an impulse recorder connected into the outlet conduit and communicating through appropriate electronic means with the means for producing the counter-vibrations so as to cause and control those counter-vibrations.

A second impulse recorder may also be connected into an outlet conduit downstream of the first impulse recorder and also communicating with the means for producing the counter-vibrations for measuring the state of the stock flow after the counter-vibrations have been applied to see whether further adjustment to the amplitude of the counter-vibrations might be desirable. A further impulse recorder connected into the outlet conduit between the preparation system and the first mentioned impulse recorder generates a transit time correction signal for the transit of vibrations through the stock suspension and is connected for controlling the first impulse recorder.

Other objects, features and advantages of the invention will be apparent from the following description, together with the accompanying drawings and appended claims.

BRIEF DESCRIPTION OF THE DRAWINGS

The invention is explained below with reference to the accompanying drawings, in which:

FIG. 2 shows a modification of part of the apparatus shown in FIG. 1.

DESCRIPTION OF A PREFERRED EMBODIMENT

Figure 1:
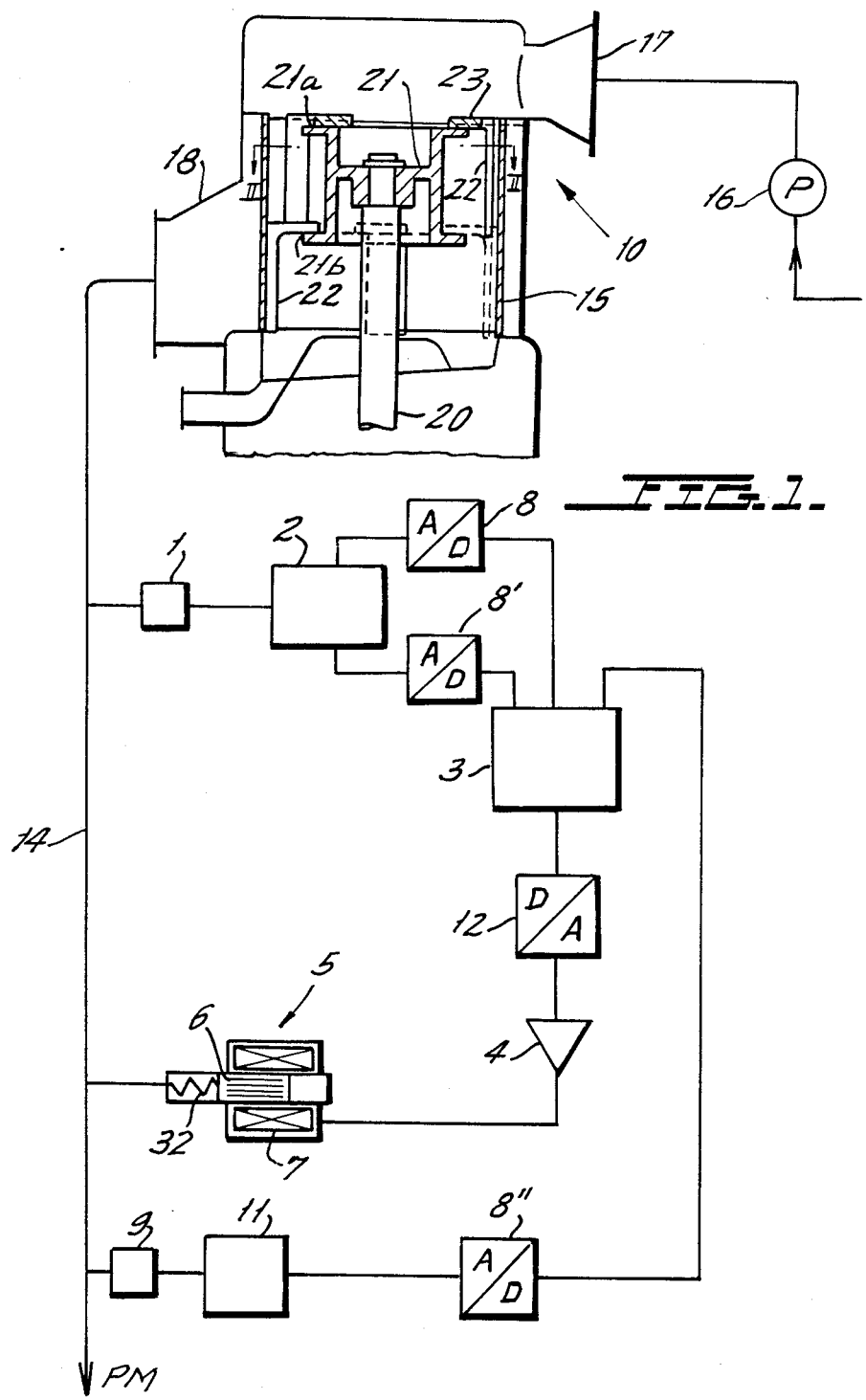
FIG. 1 is a part-sectional schematic view of a first embodiment of vibration damping control apparatus.

Referring to FIG. 1, pressure impulses are generated in the pipeline 14 leading from stock preparation apparatus 10 to the paper machine (not shown). The impulses, and particularly their frequency and amplitude are registered by means of signal or impulse recorder 1 and are passed on to a signal modulator 2. After analog/digital modulation in instrument 8 for amplitude or 8' for frequency, the digital signals travel to control means 3. This control means preferably includes an electronic data processor, in particular a microprocessor. In the control means, the received signals are adjusted and prepared so as to produce counter-output signals to enable the pressure impulses in the pipeline 14 to be countered by out-of-phase counter impulses.

The counter impulses are produced by a unit 5, which receives the counter-signals after digital/analog modulation in instrument 12 and amplifier 4. The unit 5 could be constructed, for example, substantially as an inductive vibration recorder or oscillator, including a piston 6 which can oscillate as a magnetizable metal, e.g. an iron, core inside a toroidal coil 7, the vibration being dependent upon the frequency and amplitude of the current fed into the coil 7 from the amplifier 4. Usually both frequency and amplitude are adjusted, but a system may adjust at least one. As the frequency and amplitude of this current is controlled as a function of the frequency and amplitude of the vibration impulses in the line 14, it is possible to compensate extensively for these impulses, through the out-of-phase impulses produced by the unit 5. At the same time, the piston 6, together with a spring 32 supporting it, forms a natural vibration system, so that care should be taken at the design stage that the control frequency does not lie in the range of the natural frequency.

A further improvement can be achieved by connecting another correcting impulse signal recorder 9 downstream of the connection point of unit 5 to the main line 14. The output signal of recorder 9 is inputted to the control means 3 after modulation in measuring transducer 11 and after digital/analog modulation in instrument 8''. By this addition, the amplitude of the motion of piston 6 is monitored and the counter-signals produced in control means 3 are adjusted so that the most extensive compensation possible to provided for the vibration impulses in line 14. This measure is significant, as experience has shown that vibrations in the head box system are regular in character as regards frequency and amplitude and are not produced in the same way as "roaring".

There is shown a screen 10, generally called a vertical separator, which is of the type that produces vibration impulses. Such a separator or screen has a rotor driven by a shaft 20. The rotor is comprised of a central rotor body 21 comprising upper and lower supporting flanges 21a and 21b and blades or screening elements 22 carried by the supporting flanges. The cross section of a screening element, i.e. along line II—II, has a profile in the shape of an airfoil wing. They rotate close to a rotationally symmetric surrounding wire basket 15. The suspension is supplied by means of a pump 16 to the inlet 17 of the screen. The amount of so-called "accept" which enters through the wire basket 15 passes via outlet pipe 18 into line 14, in which the above-mentioned pressure pulsations would normally continue right up to the paper machine. However, this is prevented by the control apparatus according to the invention.

It will be appreciated that, with the control apparatus according to the invention, the production of vibrations is not prevented, but instead the vibrations themselves are compensated. Therefore, it is undesirable to have a high frequency of pulsations, caused, for example, by a too high number of blades 22 on the screen 10. An attempt has already been made to increase the frequency of the vibrations by a very high number of blades, in order at the same time to achieve smaller amplitudes. In the apparatus according to the invention, it could be better to use a small number of blades and a consequent lower impulse frequency with greater amplitude, as it may be difficult to control the piston 6 of unit 5 with sufficiently high frequency. Of course, other units could also be introduced, for example, piston 6 could be replaced by a membrane which is controlled electromagnetically, as in a loud speaker.

The accuracy of the counter-vibration phase relationship is improved even more in accordance with the invention.

In such pipelines transporting fluids or suspensions as described above, the velocity of sound and its variability should not be ignored. Otherwise, a phase distortion could be produced which would greatly reduce the desired effect.

In the modification shown in FIG. 2, there is schematically shown an interference source 19, line source 10, e.g. a screening device having rotating screening blades all along a wire basket. In addition to the first signal recorder 1, there is a second signal recorder 1a. Generator 3' produces the counter-vibrations, to which the impulses of vibration recorders 1 and 1a can be modulated. A third impulse recorder 9 forms a correcting impulse for the corrected vibration. The individual components have been mentioned in flow sequence.

Impulse recorders 1 and 1a are substantially sensitive to pressure so as to record the vibration impulses of line 14. For example, line 14 may lead to a head box of a paper machine.

Let the vibration through interference source 19 be $x = p_1(t)$.

From the two out-of-phase impulse series of the two impulse recorders 1 and 1a, separated by a spacing 1 is calculated the transit time of the vibrations from the first impulse recorder to the counter-impulse generator 3' with a spacing of the counter-vibration generator 3' from the first impulse recorder 1 of $1g$ $$t_c = t_l \cdot 1_g / l.$$

Consequently the counter-vibration has the function $E - p_1(t + t_c)$.

This function can be corrected further with constants to adapt it to the mechanical (with respect to the counter-vibration generator), hydraulic and electronic data. Furthermore, the last impulse recorder 9 produces a feedback signal, which can be introduced as a further correction multiplier.

Here velocities of sound of between 500 and 1000 m/s have to be expected. This depends on the air content and various other parameters of the suspension.

If, with a 60 Hz wave, a permissible maximum amplitude error of 10% is accepted, as the permissible phase error in the zero passage of the vibration, there follows an angle of approximately 5'7°, which corresponds to a transit time of approximately 260 m/sec. It is no problem for microprocessors or computers in general to observe this with sufficient accuracy.

Although the present invention has been described in connection with preferred embodiments thereof, many variations will now become apparent to those skilled in the art. It is preferred, therefore, that the present invention be limited not by the specific disclosure herein, but only by the appended claims.

What is claimed is:

1. Control apparatus for damping the vibration in a preparation system for preparing stock suspensions,
   the preparation system including means which produce stock suspension and in the process generate vibration impulses in the stock suspension, the preparation system including an outlet conduit for prepared stock suspension, the outlet conduit being conducted with the preparation system for carrying a flow of stock suspension in which vibration impulses have been generated;
   the control apparatus comprising:
   first sensing means for sensing the vibration impulses in the flow of stock suspension in the outlet conduit;
   means connected into the outlet conduit for producing counter-vibrations in the flow of stock suspension and for generating vibrations which are out of phase with the vibration impulses that are generated in the flow of stock suspension for damping the vibrations in the flow of stock suspension;
   the first sensing means being connected with the means for producing counter-vibrations for adjusting at least one of the frequency and amplitude of the counter-vibrations produced by the means for producing counter-vibrations for maintaining the out of phase relationship and for maintaining a sufficiently elevated level of counter-vibrations at a frequency and an amplitude selected to damp the vibration impulses in the flow of stock suspension;

an impulse recorder connected into the outlet conduit downstream of the preparation system and of the first sensing means for generating a transit time correction signal for the transit of vibrations through the stock suspension for controlling the first sensing means.

2. The apparatus of claim 1, wherein the means for producing counter-vibrations comprises a magnetizable metal core in an electric coil, the coil being connected with the means for sensing vibration impulses in the stock flow, whereby an electric signal corresponding to the stock flow vibrations communicates to the coil.

3. Control apparatus for damping the vibration in a preparation system for preparing stock suspensions, the preparation system including means which produce stock suspension and in the process generate vibration impulses in the stock suspension, the preparation system including an outlet conduit for prepared stock suspension, the outlet conduit being connected with the preparation system for carrying a flow of stock suspension in which vibration impulses have been generated;

the control apparatus comprising:

first means for sensing the vibration impulses in the flow of stock suspension in the outlet conduit;

means connected into the outlet conduit for producing counter-vibrations in the flow of stock suspension and for generating vibrations which are out of phase with the vibration impulses that are generated in the flow of stock suspension for damping the vibrations in the flow of stock suspension;

the first sensing means being connected with the means for producing counter-vibrations for adjusting at least one of the frequency and amplitude of the counter-vibrations produced by the means for producing counter-vibrations for maintaining the out of phase relationship and for maintaining a sufficiently elevated level of counter-vibrations at a frequency and an amplitude selected to damp the vibration impulses in the flow of stock suspension;

a second means for sensing vibration impulses in the flow of stock suspension in the outlet conduit comprising a correcting impulse recorder connected into the outlet conduit downstream in the direction of the flow of stock suspension from the connection to the outlet conduit of the means for producing counter-vibrations, the second means for measuring the amplitude of the counter-vibrations in the flow of stock suspension in the outlet conduit, and the second means being connected to the means for producing counter-vibrations in a manner for providing a signal for adjusting the amplitude of the counter-vibrations.

4. The apparatus of claim 3, further comprising a second impulse recorder connected into the outlet conduit downstream of the preparation system and the first mentioned impulse recorder for generating a transit time correction signal for the transit of vibrations through the stock suspension for controlling the first impulse recorder.

5. The apparatus of claim 3, further comprising means for connecting the output of the second means as a feedback signal into the first means.

6. The apparatus of claim 3, wherein the means for producing the counter-vibrations comprises a magnetizable metal core in an electric coil, the coil being connected with the means for sensing vibration impulses in the stock flow, whereby an electric signal corresponding to the stock flow vibrations communicates to the coil.

* * * * *